(12) United States Patent
Lee et al.

(10) Patent No.: US 12,620,847 B2
(45) Date of Patent: May 5, 2026

(54) STATOR FOR AFPM MOTOR AND METHOD OF MANUFACTURING THE SAME

(71) Applicants:Kia Corporation, Seoul (KR); Hyundai Motor Company, Seoul (KR)

(72) Inventors: Dong Hee Lee, Hwaseong-si (KR); Jae Hyuk Seo, Anyang-si (KR); Ji Yeon Kim, Yongin-si (KR); Jae Wan Choi, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 210 days.

(21) Appl. No.: 18/516,504

(22) Filed: Nov. 21, 2023

(65) Prior Publication Data

US 2025/0007337 A1      Jan. 2, 2025

(30) Foreign Application Priority Data

Jun. 28, 2023     (KR) ........................ 10-2023-0083469

(51) Int. Cl.
H02K 1/18 (2006.01)
H02K 15/02 (2025.01)
H02K 15/06 (2025.01)

(52) U.S. Cl.
CPC .............. H02K 1/18 (2013.01); H02K 15/02 (2013.01); H02K 15/06 (2013.01); *H02K 2203/12* (2013.01)

(58) Field of Classification Search
CPC .......... H02K 1/18; H02K 15/02; H02K 15/06; H02K 2203/12; H02K 1/165
USPC ...................... 310/91, 216.051, 216.069–88
See application file for complete search history.

(56) References Cited

FOREIGN PATENT DOCUMENTS

| | | | | | |
|---|---|---|---|---|---|
| EP | 3745559 | A1 | * | 12/2020 | ............. H02K 21/24 |
| JP | 2022080466 | A | * | 5/2022 | |
| JP | 2022112344 | A | * | 8/2022 | |
| WO | WO-2018158871 | A1 | * | 9/2018 | ............. H02K 15/10 |

* cited by examiner

*Primary Examiner* — Jose A Gonzalez Quinones
(74) *Attorney, Agent, or Firm* — Slater Matsil, LLP

(57) ABSTRACT

An embodiment stator for an axial flux permanent magnet (AFPM) motor includes a plurality of stator cores arranged in a circumferential direction, each stator core of the plurality of stator cores including a winding portion on which a coil is wound and end portions of a wedge shape on both sides of the winding portion, and a plurality of core support members, each core support member of the plurality of core support members including a pair of first support portions configured to support the end portions, a second support portion connecting a first end of a first one of the pair of first support portions to a first end of a second one of the pair of first support portions, and a third support portion connecting second ends of the pair of first support portions to each other.

18 Claims, 8 Drawing Sheets

100

STATOR FOR AFPM MOTOR AND METHOD OF MANUFACTURING THE SAME

CROSS-REFERENCE TO RELATED APPLICATIONS

This application claims the benefit of Korean Patent Application No. 10-2023-0083469, filed on Jun. 28, 2023, which application is hereby incorporated herein by reference.

TECHNICAL FIELD

The present disclosure relates to a stator for an axial flux permanent magnet (AFPM) motor and a method of manufacturing the same.

BACKGROUND

In general, a motor includes a rotor equipped with a magnet and a stator equipped with a coil, and the rotor is rotated when a voltage is applied to the coil. A motor is classified into two types: an axial flux permanent magnet (AFPM) motor and a radial flux permanent magnet (RFPM) motor.

An AFPM motor has a very short axial length compared to an RFPM motor, and thus is very useful in a driving system that requires a motor having a short axial length.

In order to secure stator cores, a conventional AFPM motor includes a T-shaped support member mounted between the stator cores and a support ring surrounding the support member to tightly secure the same.

However, the conventional structure for securing stator cores has problems in that a space factor is reduced because the T-shaped support member is located between the stator cores and in that it is difficult to cool coils wound on the stator cores because fluid does not flow between the stator cores. Therefore, there is a need to develop novel technology for solving the above problems.

The information disclosed in this background section is only for enhancement of understanding of the general background of embodiments of the invention and should not be taken as an acknowledgement or any form of suggestion that this information forms the related art already known to a person skilled in the art.

SUMMARY

Accordingly, embodiments of the present disclosure are directed to a stator for an AFPM motor and a method of manufacturing the same that substantially obviate one or more problems due to limitations and disadvantages of the related art.

An embodiment of the present disclosure provides a stator for an AFPM motor, which includes a stator core support member having a novel structure for improving a space factor and cooling efficiency while securely supporting stator cores arranged in a circumferential direction, and a method of manufacturing the same.

Additional advantages, objects, and features of embodiments of the disclosure will be set forth in part in the description which follows and in part will become apparent to those having ordinary skill in the art upon examination of the following or may be learned from practice of the disclosure. The objectives and other advantages of embodiments of the disclosure may be realized and attained by the structure particularly pointed out in the written description and claims hereof as well as the appended drawings.

Various aspects of embodiments of the present disclosure are directed to a stator for an AFPM motor including a plurality of stator cores arranged in a circumferential direction, each including a winding portion on which a coil is wound and end portions of a wedge shape on both sides of the winding portion, and a plurality of core support members, each including a pair of first support portions spaced apart from each other in a longitudinal direction of the winding portion to support the end portions, a second support portion connecting one end of one of the pair of first support portions to one end of the remaining one of the pair of first support portions, and a third support portion connecting the opposite ends of the pair of first support portions to each other.

In at least one embodiment of the present disclosure, the second support portion may protrude from one end of each of the pair of first support portions in both circumferential directions and may have a greater width than the pair of first support portions.

In at least one embodiment of the present disclosure, each of the pair of first support portions may be in contact with an inner surface of a corresponding one of the end portions.

In at least one embodiment of the present disclosure, each of the plurality of stator cores may further include a pair of bobbins mounted on both sides of the winding portion and located on inner surfaces of the end portions, and each of the pair of bobbins may include an elastic hole formed in one side thereof. When each of the pair of bobbins is supported by the second support portion, the pair of bobbins may elastically support each of the plurality of stator cores as the elastic hole is deformed.

In at least one embodiment of the present disclosure, each of the pair of bobbins may be mounted between an inner surface of a corresponding one of the pair of first support portions and the coil.

In at least one embodiment of the present disclosure, the pair of first support portions may have the same thickness as the pair of bobbins.

In at least one embodiment of the present disclosure, the second support portion may include a first through-hole formed in a center thereof, and the third support portion may include a second through-hole formed in a center thereof.

In at least one embodiment of the present disclosure, the second support portion may include first grooves formed in both side ends thereof in a circumferential direction.

In at least one embodiment of the present disclosure, the second support portion may have a rounded shape.

In at least one embodiment of the present disclosure, each of the pair of first support portions may further include a partition wall protruding in the longitudinal direction in order to prevent the plurality of stator cores from contacting each other.

In another embodiment of the present disclosure, a method of manufacturing a stator for an AFPM motor includes arranging stator cores, each including a winding portion on which a coil is wound and a bobbin is mounted and end portions formed on both sides of the winding portion, in a circumferential direction, mounting core support members such that each of the core support members is disposed between two adjacent ones of the stator cores arranged in the circumferential direction, and press-fitting a support ring on outer surfaces of second support portions of the core support members.

In at least one embodiment of the present disclosure, the method may further include pressing the second support portions of the core support members in a direction of center to deform an elastic hole formed in the bobbin before press-fitting the support ring.

It is to be understood that both the foregoing general description and the following detailed description of embodiments of the present disclosure are exemplary and explanatory and are intended to provide further explanation of embodiments of the disclosure as claimed.

BRIEF DESCRIPTION OF THE DRAWINGS

The accompanying drawings, which are included to provide a further understanding of embodiments of the disclosure and are incorporated in and constitute a part of this application, illustrate embodiments of the disclosure and together with the description serve to explain the principle of embodiments of the disclosure. In the drawings.

DETAILED DESCRIPTION OF ILLUSTRATIVE EMBODIMENTS

Figure 1:
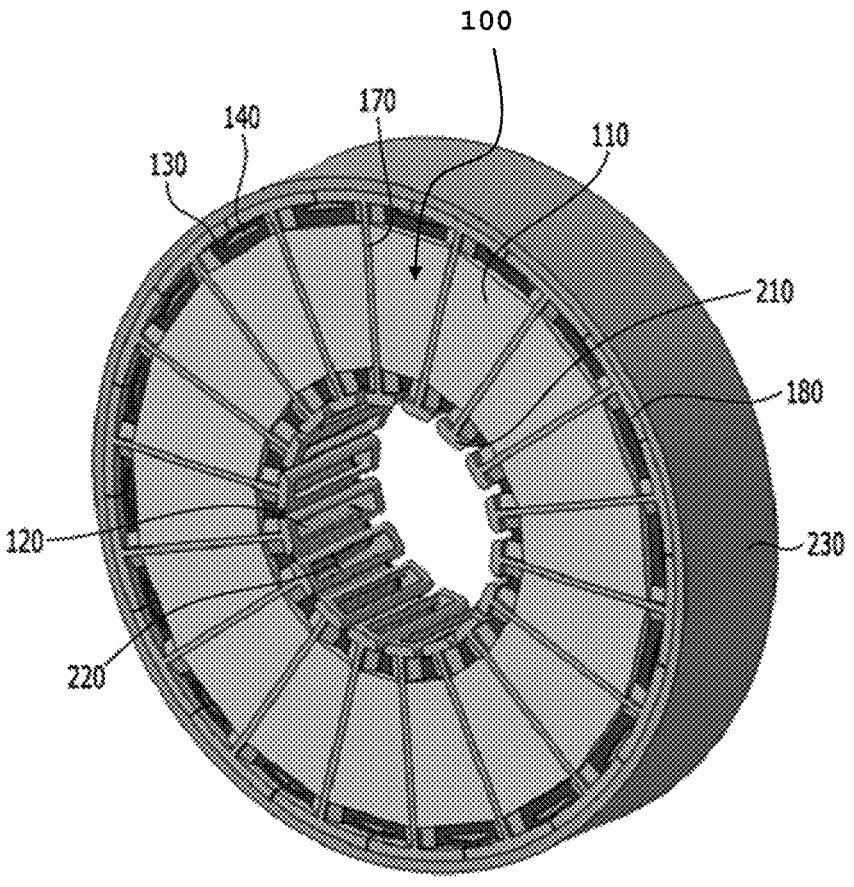
FIG. 1 is a view showing a stator for an AFPM motor according to an embodiment of the present disclosure.

Embodiments of the present disclosure may make various changes and have various embodiments, and specific embodiments are illustrated and described in the drawings. However, this is not intended to limit the embodiments of the present disclosure to a specific embodiment and should be understood to include all changes, equivalents, or substitutes included in the spirit and technical scope of embodiments of the present disclosure.

Although terms including ordinal numbers, such as "first," "second," etc., may be used herein to describe various elements, the elements are not limited by these terms. These terms are only used to distinguish one element from another.

The term "and/or" is used to include any combination of a plurality of items that are the subject matter. For example, "A and/or B" inclusively means all three cases such as "A," "B," and "A and B."

It should be understood that when a component is referred to as being "connected to" or "coupled to" another component, it may be directly connected to or coupled to another component or intervening components may be present. On the other hand, when a component is referred to as being "directly connected to" or "directly coupled to" another component, there are no intervening components present.

In the description of the embodiments, when an element, such as a layer (film), a region, a pattern, or a structure, is referred to as being "on" or "under" another element, such as a substrate, a layer (film), a region, a pad, or a pattern, it should be understood that the element may be directly on or under the other element or an intervening element may also be present between the two elements.

Also, it should be understood that criteria of "above" or "below" is on the basis of the drawing for convenience. The term "above" or "below" is used only to indicate the relative positional relationship between components and should not be construed as limiting the actual positions of the components. For example, the phrase "B above A" merely indicates that B is illustrated in the drawing as being located above A. Unless otherwise stated or unless B must be located above A due to the natures of A or B, B may be located under A, or B and A may be disposed in a leftward-rightward direction in an actual product.

In addition, the thickness or size of a layer (film), a region, a pattern, or a structure shown in the drawings may be exaggerated, omitted, or schematically drawn for the clarity and convenience of explanation and may not accurately reflect the actual size.

Terms used in this application are only used to describe specific embodiments and are not intended to limit the embodiments of the present disclosure. A singular expression includes the plural form unless the context clearly dictates otherwise. In the present specification, it should be understood that a term such as "include" or "have" is intended to designate that the features, numbers, steps, operations, elements, parts, or combinations thereof described in the specification are present, and the term does not preclude the possibility of addition or presence of one or more other features, numbers, steps, operations, elements, parts, or combinations thereof.

Unless defined otherwise, all terms used herein, including technical or scientific terms, have the same meanings as commonly understood by one of ordinary skill in the art to which the present disclosure belongs. Terms such as those defined in commonly used dictionaries should be interpreted as having meanings consistent with the meanings in the context of the related art, and unless explicitly defined in this application, the terms should not be interpreted as having ideal or excessively formal meanings.

Hereinafter, the embodiments will be described in detail with reference to the accompanying drawings, and the same or similar elements are denoted by the same reference numerals even though they are depicted in different drawings, and redundant descriptions thereof will be omitted.

Hereinafter, a stator for an AFPM motor according to embodiments of the present disclosure will be described with reference to the accompanying drawings.

The stator for an AFPM motor according to an embodiment of the present disclosure includes a stator core 100 and a core support member 150.

As shown in FIG. 1, the stator core 100 is provided in plural, and the plurality of stator cores 100 is arranged in a circumferential direction.

Figure 2:
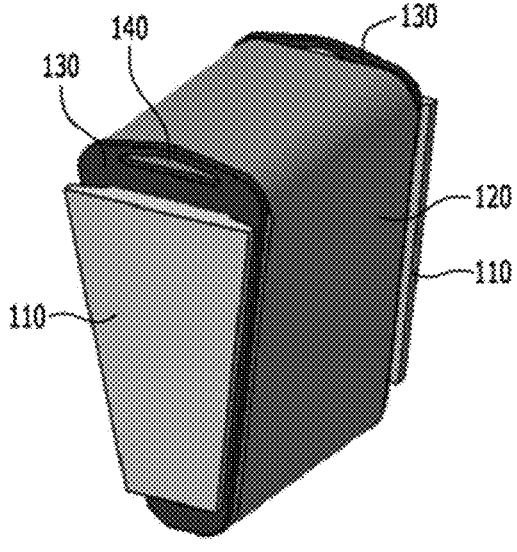
FIG. 2 is a view showing a stator core of the stator for an AFPM motor according to an embodiment of the present disclosure.

Referring to FIG. 2, each of the stator cores 100 includes a winding portion (not shown), on which a coil 120 is wound, and end portions 110, which are formed on both sides of the winding portion and have a wedge shape that is gradually narrowed from an upper portion 131 (see FIG. 8) to a lower portion.

Bobbins 130, which will be described later, are mounted on both ends of the winding portion of each of the stator cores 100. The coil 120 is wound between the plurality of bobbins 130. When the coil 120 is wound on the winding portion, the stator core 100 and the coil 120 may be tightly coupled to each other due to tension of the coil 120.

Figure 6:
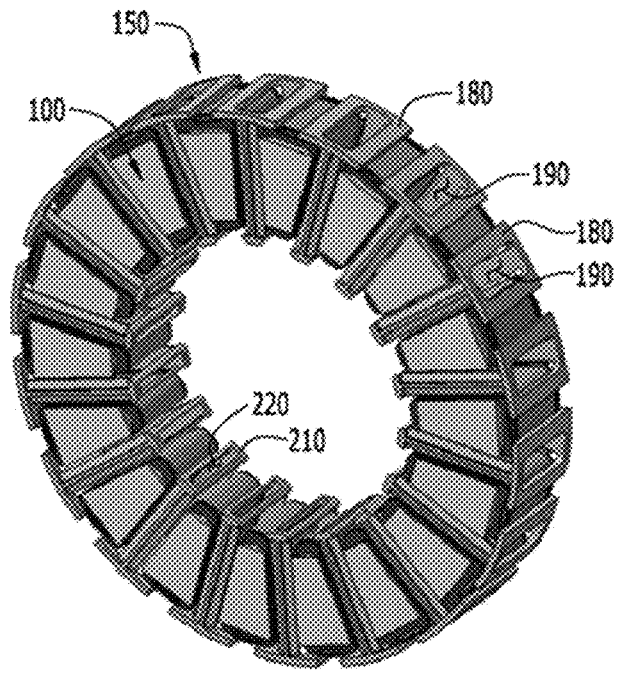
FIG. 6 is a view showing the stator cores and the core support members alternately arranged in a circumferential direction in the stator for an AFPM motor according to an embodiment of the present disclosure.
Figure 7:
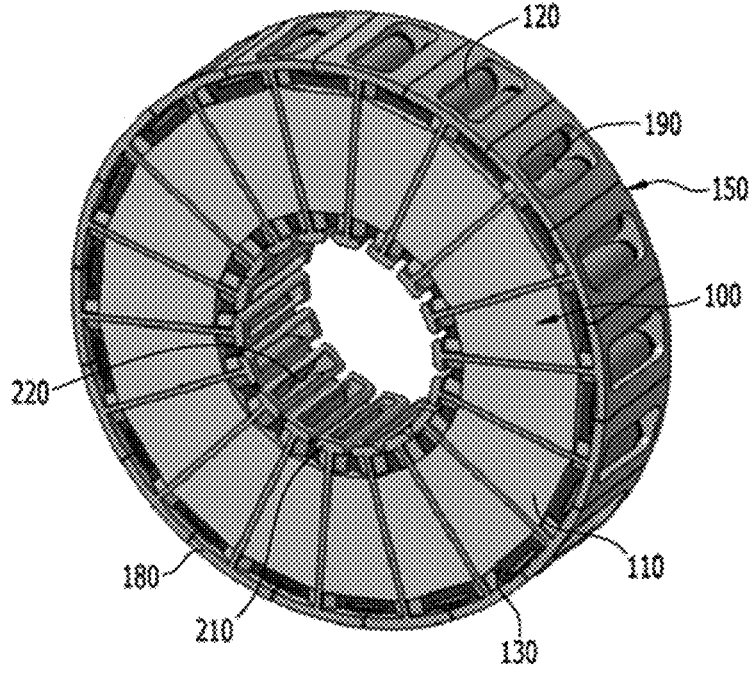
FIG. 7 is a view showing coupling of the core support members to the stator cores in the stator for an AFPM motor according to an embodiment of the present disclosure.

As shown in FIGS. 1, 6, and 7, the core support member 150 is provided in plural, and each of the plurality of core support members 150 is mounted between two adjacent ones of the plurality of stator cores 100 arranged in the circumferential direction.

Figure 3:
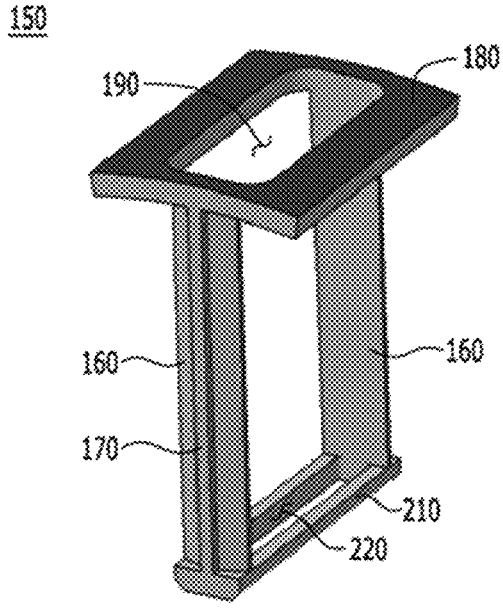
FIG. 3 is a view showing a core support member of the stator for an AFPM motor according to an embodiment of the present disclosure.
Figure 4:
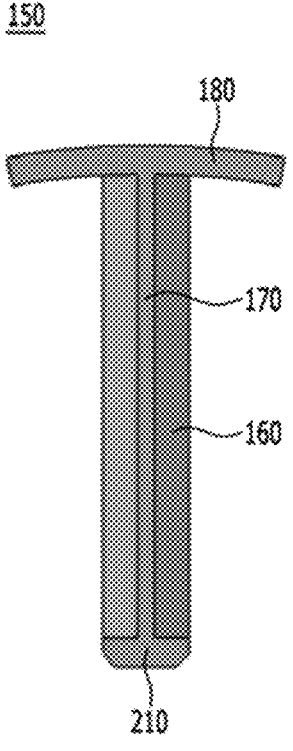
FIG. 4 is a front view of the core support member of the stator for an AFPM motor according to an embodiment of the present disclosure.
Figure 5:
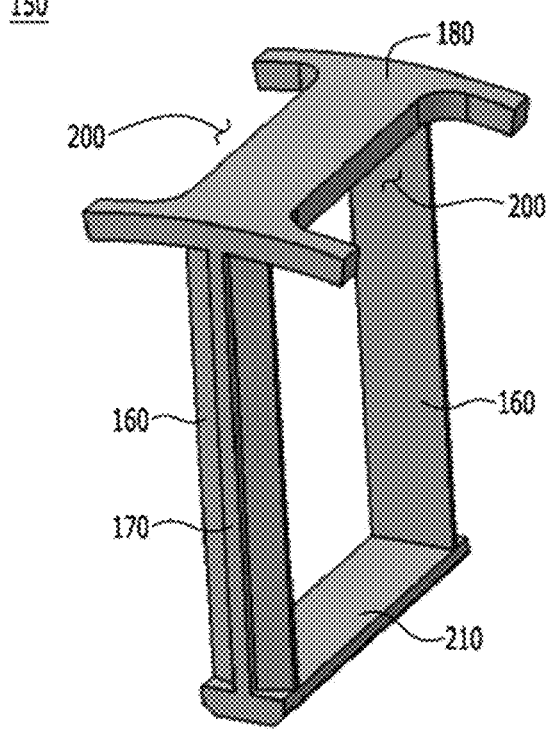
FIG. 5 is a view showing another example of the core support member of the stator for an AFPM motor according to an embodiment of the present disclosure.

Referring to FIGS. 3 and 4, each of the plurality of core support members 150 includes a first support portion 160, a second support portion 180, and a third support portion 210.

The first support portion 160 is provided in a pair, and the pair of first support portions 160 is spaced apart from each other in a longitudinal direction of the winding portion in order to support the end portions 110 of each of the stator cores 100.

As shown in FIGS. 6 and 7, each of the first support portions 160 supports a corresponding one of the end portions 110 in such a manner that the outer surface thereof is in contact with the inner surface of the corresponding end portion 110.

Referring to FIGS. 3 and 4, each of the first support portions 160 may further include a partition wall 170 protruding in the longitudinal direction in order to prevent the plurality of stator cores 100 from contacting each other. As shown in FIG. 7, the partition wall 170 serves to separate the end portions 110 from each other so that the end portions 110 do not contact each other. In addition, the partition wall 170 exhibits effects of preventing deterioration in performance of the motor or occurrence of short circuit due to foreign substances accumulated between the end portions 110.

Referring to FIG. 3, the second support portion 180 is formed in the longitudinal direction of the winding portion and connects ends (upper ends on the basis of the drawing) of the first support portions 160 to each other.

The second support portion 180 protrudes in both directions perpendicular to the longitudinal direction of the winding portion, i.e., in both circumferential directions. As shown in FIG. 4, when viewed from the front, the core support member may have a T-shape. The second support portion 180 is formed to have a larger width than the first support portions 160.

As shown in FIG. 4, the second support portion 180 may be formed so as to protrude from both sides of each of the first support portions 160 and may have a shape rounded downward toward both distal ends thereof. The second support portion 180 may have the same curvature as a support ring 230, which will be described later.

The second support portion 180 includes a first through-hole 190 formed in the center thereof.

In another embodiment, the second support portion 180 includes first grooves 200 formed in both side ends thereof in the circumferential direction. When the plurality of core support members 150 is arranged such that the second support portions 180 contact each other, the first grooves 200 in two adjacent ones of the second support portions 180 form a hole.

The third support portion 210 is formed in the longitudinal direction of the winding portion and supports the other ends (lower ends on the basis of the drawing) of the first support portions 160. The third support portion 210 includes a second through-hole 220 formed in the center thereof.

The embodiment has been described above as being configured such that the partition wall 170 is formed on the first support portion 160, the first through-hole 190 or the first groove 200 is formed in the second support portion 180, and the second through-hole 220 is formed in the third support portion 210. However, in another embodiment, although not shown in the drawings, the partition wall 170 formed on the first support portion 160 may be omitted. Also, the first through-hole 190 or the first groove 200 formed in the second support portion 180 may be omitted. Also, the second through-hole 220 formed in the third support portion 210 may be omitted. In particular, when the first through-hole 190 and the second through-hole 220 are omitted, it is possible to obtain the effect of further increasing supporting force.

The stator core 100 further includes a pair of bobbins 130 mounted on both sides of the winding portion and located on the inner surfaces of the end portions 110.

Figure 8:
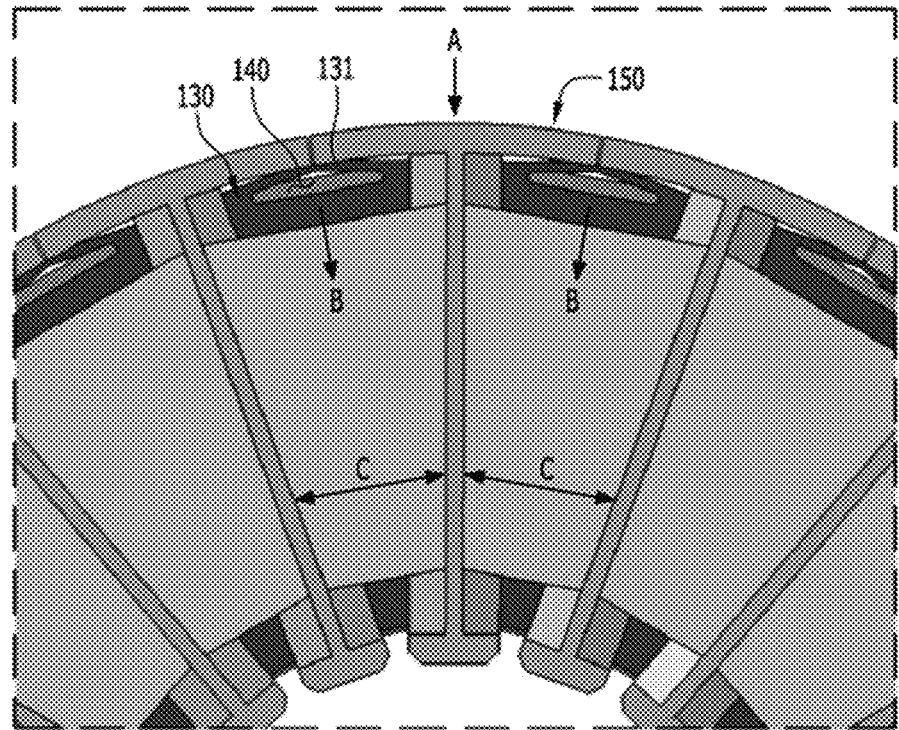
FIG. 8 is a view showing a process in which the stator cores and the core support members are securely coupled to each other due to the principle of a wedge in the stator for an AFPM motor according to an embodiment of the present disclosure.

As shown in FIG. 2, the bobbin 130 may include an elastic hole 140 formed in one side of the upper portion 131 thereof, and the upper portion 131 in which the elastic hole 140 is formed may further protrude in the shape of a mountain peak. Due to this shape of the bobbin 130, as illustrated in FIG. 8, when the core support member 150 mounted between the cores is pressed in the direction A of the center thereof, the upper portion 131 of the bobbin 130 is pressed by the second support portion 180 in the direction B of the center of the circle, and thus the elastic hole 140 is deformed. Accordingly, the end portion 110 of the stator core 100 exerts force in both circumferential directions C due to the principle of a wedge, with a result that the end portion 110 and the core support member 150 may be more securely supported.

The bobbin 130 may be made of engineering plastic having predetermined strength and elasticity. In particular, the bobbin 130 may be made of any insulating material, so long as the material is sufficiently elastic to prevent plastic deformation of the upper portion 131 having the elastic hole 140 formed therein when the upper portion 131 is pressed. The bobbin 130 may be mounted between the first support portions 160 of the plurality of core support members 150.

Next, a method of manufacturing a stator for an AFPM motor by coupling the stator cores 100 and the core support members 150 will be described.

In order to manufacture a stator for an AFPM motor, first, the stator cores 100, each of which includes the winding portion (not shown) on which the coil 120 is wound and the bobbins 130 are mounted and the end portions 110 formed on both sides of the winding portion, are arranged in the circumferential direction. As described above and illustrated in FIG. 2, each of the stator cores 100 includes the bobbins 130 and the coil 120 wound on the winding portion.

After the stator cores 100 are arranged in the circumferential direction, the core support members 150 are mounted such that each of the core support members 150 is disposed between two adjacent ones of the stator cores 100, as shown in FIG. 6.

When the core support members 150 are completely mounted between the stator cores 100 as shown in FIG. 7, the support ring 230 is press-fitted on the outer surfaces of the second support portions 180 of the core support members 150, as shown in FIG. 1.

According to an embodiment, before the support ring 230 is press-fitted on the outer surfaces of the second support portions 180 of the core support members 150, the second support portion 180 of each of the core support members 150 may be pressed in the direction A of the center thereof, as shown in FIG. 8. Accordingly, the upper portion 131 of the bobbin 130 may be pressed by the second support portion 180 in the direction B of the center of the circle, and thus the end portion 110 of the stator core 100 may exert force in both circumferential directions C due to the principle of a wedge, with a result that the end portion 110 and the core support member 150 may be securely supported.

As is apparent from the above description, the embodiments exhibit effects of improving a space factor and cooling efficiency while securely supporting stator cores arranged in a circumferential direction.

However, the effects achievable through embodiments of the present disclosure are not limited to the above-mentioned effects, and other effects not mentioned herein will be clearly understood by those skilled in the art from the above description.

While embodiments of the present disclosure have been particularly shown and described with reference to exemplary embodiments thereof, these embodiments are only proposed for illustrative purposes and do not restrict the embodiments of the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the embodiments of the present disclosure as defined by the appended claims.

What is claimed is:

1. A stator for an axial flux permanent magnet (AFPM) motor, the stator comprising:
a plurality of stator cores arranged in a circumferential direction, each stator core of the plurality of stator cores comprising a winding portion on which a coil is wound and end portions of a wedge shape on both sides of the winding portion; and
a plurality of core support members, each core support member of the plurality of core support members comprising a pair of first support portions configured to support the end portions, a second support portion connecting a first end of a first one of the pair of first support portions to a first end of a second one of the pair of first support portions, and a third support portion connecting second ends of the pair of first support portions to each other.

2. The stator of claim 1, wherein the second support portion protrudes from the first end of each first support portion of the pair of first support portions in both circumferential directions and has a greater width than a combined width of the pair of first support portions.

3. The stator of claim 1, wherein each first support portion of the pair of first support portions is in contact with an inner surface of a corresponding one of the end portions.

4. The stator of claim 1, wherein each stator core of the plurality of stator cores further comprises a pair of bobbins mounted on both sides of the winding portion and located on inner surfaces of the end portions, each bobbin of the pair of bobbins comprising an elastic hole disposed in one side thereof.

5. The stator of claim 4, wherein, in a state in which each bobbin of the pair of bobbins is supported by the second support portion, the pair of bobbins elastically supports each stator core of the plurality of stator cores as the elastic hole is deformed.

6. The stator of claim 5, wherein each bobbin of the pair of bobbins is placed between an inner surface of a corresponding one of the pair of first support portions and the coil.

7. The stator of claim 1, wherein the second support portion comprises a first through-hole in a center thereof, and wherein the third support portion comprises a second through-hole in a center thereof.

8. The stator of claim 1, wherein the second support portion comprises first grooves defined in both side ends thereof in the circumferential direction.

9. The stator of claim 1, wherein the second support portion is in a rounded shape.

10. The stator of claim 1, wherein each first support portion of the pair of first support portions further comprises a partition wall protruding in a longitudinal direction to prevent the plurality of stator cores from contacting each other.

11. A method of manufacturing a stator for an axial flux permanent magnet (AFPM) motor, wherein the stator comprises a plurality of stator cores arranged in a circumferential direction and a plurality of core support members, wherein each stator core of the plurality of stator cores comprises a winding portion on which a coil is wound and end portions of a wedge shape on both sides of the winding portion, and wherein each core support member of the plurality of core support members comprises a pair of first support portions configured to support the end portions, a second support portion connecting a first end of a first one of the pair of first support portions to a first end of a second one of the pair of first support portions, and a third support portion connecting second ends of the pair of first support portions to each other, the method comprising:
arranging the plurality of stator cores in a circumferential direction, each of the plurality of stator cores comprising a winding portion on which a coil is wound and on which a bobbin is mounted and end portions disposed on both sides of the winding portion;
mounting the plurality of core support members such that each of the core support members is disposed between two adjacent ones of the stator cores arranged in the circumferential direction; and
press-fitting a support ring on outer surfaces of the second support portions of the plurality of core support members.

12. The method of claim 11, further comprising pressing the second support portions of the plurality of core support members in a direction of center to deform an elastic hole formed in the bobbin before press-fitting the support ring.

13. The method of claim 11, wherein the second support portion protrudes from the first end of each first support portion of the pair of first support portions in both circumferential directions and has a greater width than a combined width of the pair of first support portions.

14. The method of claim 11, wherein each first support portion of the pair of first support portions is in contact with an inner surface of a corresponding one of the end portions.

15. The method of claim 11, wherein the second support portion comprises a first through-hole in a center thereof, and wherein the third support portion comprises a second through-hole in a center thereof.

16. The method of claim 11, wherein the second support portion comprises first grooves defined in both side ends thereof in the circumferential direction.

17. The method of claim 11, wherein the second support portion is in a rounded shape.

18. The method of claim 11, wherein each first support portion of the pair of first support portions further comprises a partition wall protruding in a longitudinal direction to prevent the plurality of stator cores from contacting each other.

\* \* \* \* \*